W. B. WILLIAMS.
Plow-Point.
No. 67,831
Patented Aug. 13, 1867.
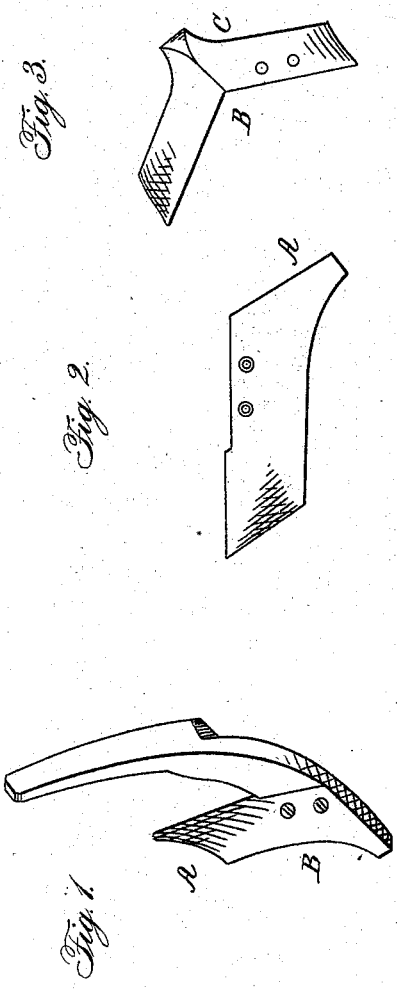

United States Patent Office.

WILLIAM B. WILLIAMS, OF WARRENTON, NORTH CAROLINA.

Letters Patent No. 67,831, dated August 13, 1867.

IMPROVEMENT IN COTTON-PLOUGHS.

*The Schedule referred to in these Letters Patent and making part of the same.*

TO ALL WHOM IT MAY CONCERN:

Be it known that I, WILLIAM B. WILLIAMS, of Warrenton, in the county of Warren, and State of North Carolina, have invented a new and useful improvement in a Plough for the Cultivation of Cotton and any other young crop; and I do hereby declare that the following is a full, clear, and exact description of the construction of the same, reference being had to the annexed drawings, making a part of the specification, in which—

Figure 1 is a perspective view of the plough.

Figure 2 exhibits the point detached from the plough.

Figure 3 represents the double point, which is also detached from the plough.

The curved wing A to the point B is intended to be used for throwing the earth to the young crop, before it is large enough to bear the dirt from any ordinary mould-board, and may be attached either to the plough, (for which I obtained a patent the 13th day of September, 1859, and numbered 25,463,) or the points may be attached to any ordinary plough with short mould-board. The double point C, with curved wings, I intend to be used for splitting or finishing the centres of the rows.

What I claim as my invention, and desire to secure by Letters Patent, is—

The extension of the wing or wings of the point; also the curve of the point or points.

W. B. WILLIAMS.

Witnesses:
 JOSEPH BECSEY,
 H. J. ARETZ.